United States Patent
Yao et al.

(10) Patent No.: US 12,323,997 B2
(45) Date of Patent: Jun. 3, 2025

(54) DOWNLINK CONTROL INFORMATION (DCI) FOR SIDELINK GRANT

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Wei Zeng, Saratoga, CA (US); Yushu Zhang, Beijing (CN); Weidong Yang, San Diego, CA (US); Oghenekome Oteri, San Diego, CA (US); Haitong Sun, Cupertino, CA (US); Yuchul Kim, San Jose, CA (US); Hong He, San Jose, CA (US); Jie Cui, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/392,983

(22) Filed: Dec. 21, 2023

(65) Prior Publication Data
US 2024/0137939 A1  Apr. 25, 2024

Related U.S. Application Data

(63) Continuation of application No. 17/267,852, filed as application No. PCT/CN2020/074915 on Feb. 12, 2020, now Pat. No. 11,889,515.

(51) Int. Cl.
*H04W 72/23* (2023.01)
*H04L 1/08* (2006.01)
(Continued)

(52) U.S. Cl.
CPC ............... *H04W 72/23* (2023.01); *H04L 1/08* (2013.01); *H04L 1/1812* (2013.01); *H04W 72/0453* (2013.01); *H04W 76/30* (2018.02)

(58) Field of Classification Search
CPC ........ H04L 1/08; H04L 1/1812; H04L 1/1822; H04L 1/1887; H04W 4/40;
(Continued)

(56) References Cited

U.S. PATENT DOCUMENTS 9,306,721 B2 * 4/2016 Jung .................... H04L 5/0055
10,536,972 B2    1/2020 Kim et al.
(Continued)

FOREIGN PATENT DOCUMENTS

CA    3113083 A1 *  4/2020 ........... H04L 1/1819
CN    109076578 A    12/2018
(Continued)

OTHER PUBLICATIONS

English Translation of Description of WO-2021146968-A1 (Espacenet English Translation) (Year: 2021).*
(Continued)

*Primary Examiner* — Eric Nowlin
(74) *Attorney, Agent, or Firm* — Eschweiler & Potashnik, LLC; Matthew W Glause

(57) ABSTRACT

A service device (e.g., a user equipment (UE), a new radio NR (gNB), or other network component) as a service provider/consumer can process or generate sidelink communications based on a downlink control information (DCI) for one or more sidelink configured grants that enables resource allocation for the sidelink communication. The device can determine whether to activate, release/deactivate, or request a retransmission for the one or more sidelink configured grants based on one or more fields of a DCI format 3_0 configuration of the DCI.

19 Claims, 8 Drawing Sheets

(51) Int. Cl.
  *H04L 1/1812*    (2023.01)
  *H04W 72/0453*   (2023.01)
  *H04W 76/30*     (2018.01)

(58) Field of Classification Search
  CPC . H04W 72/0453; H04W 72/20; H04W 72/23; H04W 76/14; H04W 76/30; H04W 92/18
  See application file for complete search history.

(56) References Cited

U.S. PATENT DOCUMENTS

| | | | |
|---|---|---|---|
| 10,645,527 B2 | 5/2020 | Kwon et al. | |
| 10,750,521 B2 | 8/2020 | Lee et al. | |
| 11,382,083 B2* | 7/2022 | Guo | H04W 88/023 |
| 11,546,937 B2* | 1/2023 | Cao | H04L 1/1887 |
| 12,082,207 B2* | 9/2024 | Li | H04W 72/23 |
| 2014/0269338 A1* | 9/2014 | Jung | H04L 5/0055 |
| | | | 370/329 |
| 2017/0289733 A1 | 10/2017 | Rajagopal et al. | |
| 2019/0268935 A1 | 8/2019 | Talarico et al. | |
| 2020/0029318 A1* | 1/2020 | Guo | H04W 76/14 |
| 2020/0037280 A1* | 1/2020 | Enbuske | H04W 72/23 |
| 2020/0107351 A1 | 4/2020 | Lee | |
| 2021/0144750 A1* | 5/2021 | Cao | H04W 72/0453 |
| 2021/0336727 A1* | 10/2021 | Miao | H04W 72/0446 |
| 2022/0007403 A1* | 1/2022 | Li | H04W 72/23 |
| 2022/0322421 A1* | 10/2022 | Zhao | H04L 1/1822 |
| 2022/0393805 A1* | 12/2022 | Guo | H04L 1/1812 |
| 2023/0056714 A1* | 2/2023 | Loehr | H04L 1/1845 |
| 2023/0102454 A1* | 3/2023 | Yoshioka | H04W 72/25 |
| | | | 370/329 |
| 2023/0111565 A1* | 4/2023 | Lee | H04L 5/0094 |
| | | | 370/329 |
| 2023/0292353 A1* | 9/2023 | Wang | H04W 72/566 |
| 2023/0319815 A1* | 10/2023 | Lee | H04L 1/1887 |
| | | | 370/329 |
| 2024/0023109 A1* | 1/2024 | Elazzouni | H04L 1/1848 |
| 2024/0040594 A1* | 2/2024 | Peng | H04W 72/40 |
| 2024/0137939 A1* | 4/2024 | Yao | H04W 72/23 |

FOREIGN PATENT DOCUMENTS

| | | | | |
|---|---|---|---|---|
| CN | 110383933 A | | 10/2019 | |
| CN | 114830816 A | * | 7/2022 | |
| EP | 3509379 A1 | * | 7/2019 | H04L 1/0008 |
| EP | 3860027 A1 | * | 8/2021 | H04L 1/1812 |
| EP | 4092942 A1 | * | 11/2022 | H04L 1/1812 |
| EP | 4102921 A1 | * | 12/2022 | H04L 1/1812 |
| EP | 3641473 B1 | * | 2/2024 | H04L 1/08 |
| EP | 3858024 B1 | * | 10/2024 | H04B 7/0626 |
| EP | 4451781 A2 | * | 10/2024 | H04B 7/0626 |
| JP | 2019530294 A | | 10/2019 | |
| JP | 2022502934 A | * | 1/2022 | |
| KR | 20210064343 A | * | 6/2021 | |
| WO | WO-2020033751 A1 | * | 2/2020 | H04J 11/0079 |
| WO | WO-2020068252 A1 | * | 4/2020 | H04L 1/08 |
| WO | WO-2021088056 A1 | * | 5/2021 | |
| WO | WO-2021146968 A1 | * | 7/2021 | |
| WO | WO-2024015142 A1 | * | 1/2024 | H04L 1/1822 |

OTHER PUBLICATIONS

International Search Report dated Sep. 30, 2020 for International Application No. PCT/CN2020/074915.
"On NR Uu controlling LTE sidelink." Source: CATT. Agenda Item: 7.2.4.7. 3GPP TSG RAN WG1 Meeting #97, Reno, USA, May 13-17, 2019. R1-1906321.
"Discussion on Mode 1 Resource Allocation." Source: Apple. Agenda Item: 7.2.4.2.1. 3GPP TSG RAN WG1 #98bis, Chongqing, China, Oct. 14-20, 2019. R1-1910961.
3rd Generation Partnership Project; Technical Specification Group Radio Access Network; NR; Physical channels and modulation; (Release 15); 3GPP TS 38.211 V15.8.0 (Dec. 2019); http://www.3gpp.org.
3rd Generation Partnership Project; Technical Specification Group Radio Access Network; NR; Physical channels and modulation; (Release 16); 3GPP TS 38.211 V16.0.0 (Dec. 2019); http://www.3gpp.org.
3rd Generation Partnership Project; Technical Specification Group Radio Access Network; NR; Multiplexing and channel coding; (Release 16); 3GPP TS 38.212 V16.0.0 (Dec. 2019); http://www.3gpp.org.
3rd Generation Partnership Project; Technical Specification Group Radio Access Network; NR; Physical layer procedures for control; (Release 15); 3GPP TS 38.213 V15.8.0 (Dec. 2019); http://www.3gpp.org.
3rd Generation Partnership Project; Technical Specification Group Radio Access Network; NR; Physical layer procedures for control; (Release 16); 3GPP TS 38.213 V16.0.0 (Dec. 2019); http://www.3gpp.org.
3rd Generation Partnership Project; Technical Specification Group Radio Access Network; NR; Medium Access Control (MAC) protocol specification; (Release 15); 3GPP TS 38.321 V15.8.0 (Dec. 2019); http://www.3gpp.org.
Office Action received for Japanese Patent Application No. 2022-548916, mailed Jul. 10, 2023, 5 pages including 1 pages English translation.
Vivo; Discussion on mode 1 resource allocation mechanism; 7.2.4.2.1; Discussion and Decision; R1-1912021; 3GPP TSG RAN WG1 Meeting #99 Reno, USA, Nov. 18-22, 2019.
Ericsson; Enhancement of Configured Grant for NR URLLC; 7.2.6.6; Discussion, Decision; R1-1910550; 3GPP TSG RAN WG1 Meeting #98bis; Chongqing, China, Oct. 14-20, 2019.
Huawei, HiSilicon; Sidelink resource allocation mode 1; 7.2.4.2.1; Discussion and Decision; R1-1911883; 3GPP TSG RAN WG1 Meeting #99; Reno, USA, Nov. 18-22, 2019.
ZTE, Sanechips; Mode 1 resource allocation schemes on sidelink; 7.2.4.2.1; Discussion and decision; R1-1912552; 3GPP TSG RAN WG1 #99; Reno, Nevada, US, Nov. 18-22, 2019.
International Search Report, Mailed date: Nov. 13, 2017, Application No. PCT/US2017/046780.
Qualcomm Incorporated: "SPS for V2V Communication", 3GPP Draft; R2-164063 SPS for V@V Communication, 3RD Generation Partnership Project (3GPP), Mobile Competence Centre; 650, Route Des Luciloes; F-06921 Sophia-Antipolis Cedex; France, vol. RAN WG2, No. Nanjing, China; May 23, 2016-May 27, 2016, May 22, 2016 (May 22, 2016), XP051105386, Retrieved from the Internet: URL:http://www.3gpp.org/ftp/Meetings_3GPP_SYNC/RAN2/Docs/ [retrieved on May 22, 2016] p. 1-p. 3. line 2.
ZTE: "SPS enhancements for V2V over PC5", 3GPP Draft; R2-163836 SPS Enahncements for V2V Over PC5, 3RD Generation Partnership Project (3GPP), Mobile Competence Centre; 650, Route Des Luciloes; F-06921 Sophia-Antipolis Cedex; France, vol. RAN WG2, No. Nanjing, China; May 23, 2016-May 27, 2016 May 22, 2016 (May 22, 2016), XP051105236, Retrieved from the Internet: URL:http://www.3gpp.org/ftp/Meetings_3GPP_SYNC/RAN2/Docs/ [retrieved on May 22, 2016] section 2.1 section 2.4; Fig. 1.
Ericsson: "Sidelink Resource Allocation in V2X", 3GPP Draft; R2-164105—Sidelink Resource Allocation in V2X, 3RD Generation Partnership Project (3GPP), Mobile Competence Centre; 650, Route Des Luciloes; F-06921 Sophia-Antipolis Cedex; France, vol. RAN WG2, No. Nanjing, P.R. China; May 23, 2016-May 27, 2016 May 22, 2016 (May 22, 2016), XP051105422, Retrieved from the Internet: URL:http://www.3gpp.org/ftp/Meetings_3GPP_SYNC/RAN2/Docs/ [retrieved on May 22, 2016] section 2.2.1.
Huawei et al: "Enhancements for Sidelink Resource Allocation", 3GPP Draft; R2-163812 Enhancements for Sidelink Resource Allocation, 3RD Generation Partnership Project (3GPP), Mobile Competence Centre; 650, Route Des Luciloes; F-06921 Sophia-Antipolis Cedex; FR, vol. RAN EG2, No. Nanjing, China; May 23, 2016-May 27, 2016 May 22, 2016 (May 22, 2016), XP051105218, Retrieved from the Internet: URL:http://www.3gpp.org/ftp/Meetings_3GPP_SYNC/RAN2/Docs/ [retrieved on May 22, 2016] section 2.1.1.
Huawei et al: "SPS enhancement for V2V", 3GPP Draft; R1-164818, 3RD Generation Partnership Project (3GPP), Mobile Competence Centre; 650, Route Des Luciloes; F-06921 Sophia-Antipolis Cedex;

(56) References Cited

OTHER PUBLICATIONS

France, vol. RAN WG1, No. Nanjing, China; May 23, 2016-May 27, 2016 May 14, 2016 (May 14, 2016), XP051089914, Retrieved from the Internet: URL:http://www.3gpp.org/ftp/tsg_ran/WG1_RL1/TSGR1_85/Docs/ [retrieved on May 14, 2016] section 2.3.1.
Notice of Allowance dated Sep. 13, 2023 in connection with U.S. Appl. No. 17/267,852.
European Extended Search Report mailed Apr. 10, 2024 in connection to Application No. 20919032.
Nokia; "Introduction of NR V2X"; 3GPP Draft; R1-1913643; vol. RAN WG1; Dec. 6, 2019.
Mediatek Inc; "On Uplink inter-UE transmission prioritization and multiplexing" 3GPP Draft; R1-1912120; vol. RAN WG1; Nov. 9, 2019.
Nokia; UL Transmission without grant; 3GPP Draft; R1-1718623; vol. RAN WG1; Oct. 8, 2017.
Futurewei; Remaining details on mode-1 resource allocation; 3GPP TSG RAN WG1 #99; R1-1912429; 3GPP server Nov. 8, 2019.
Korean Office Action dated Dec. 12, 2024 in connection with Application No. 10-2022-7026693.

\* cited by examiner

DOWNLINK CONTROL INFORMATION (DCI) FOR SIDELINK GRANT

REFERENCE TO RELATED APPLICATION

This application is a Continuation of U.S. application Ser. No. 17/267,852, filed on Feb. 11, 2021, which is a national phase entry of International Patent Application No. PCT/CN2020/074915, filed Feb. 12, 2020. The contents of the above-referenced Patent Applications are hereby incorporated by reference in their entirety.

FIELD

The present disclosure relates to wireless technology and more specifically to downlink control information (DCI) for one or more sidelink grants.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Some services have ultra-low latency, high data capacity, and strict reliability requirements, as any faults or performance issues in the networks can cause service failure which may result in property damage and body injury. A type of mobile communication includes vehicle communication, where vehicles communicate or exchange vehicle related information. The vehicle communication can include vehicle to everything (V2X), which can include vehicle to vehicle (V2V), vehicle to infrastructure (V2I), and vehicle to pedestrian (V2P), or the like, in which each can include a user equipment (UE) or base station device such as a new radio NodeB (gNB), an eNodeB (eNB), or other device/node. A V2X node, for example, can comprises a new radio NodeB (gNB), an eNodeB (eNB), a user equipment (UE), a Roadside Unit (RSU), a drone, or other vehicle device, or network device when referred to herein. In some situations, vehicle related information is intended for a single vehicle or other entity. In other situations, such as emergency alerts, vehicle related information is intended for a large number of vehicles or other device entities. The emergency alerts can include collision warnings, control loss warnings, collision avoidance, pedestrian safety and other coordination to ensure safe and efficient traffic flows, especially in vehicle (e.g., auto, craft, drone, etc.) to vehicle communications.

Long Term Evolution (LTE) network or New Radio (NR) cellular technologies are being developed to support direct communication among devices (e.g. vehicles, drones, wearables, etc.). As of today, sidelink communication is enabled in V2X technology where multiple reference sources can be used for sidelink synchronization Global Navigation Satellite System (GNSS), eNodeB (eNB), sidelink synchronization signal (SLSS) (UE deriving timing from either GNSS, eNB or other user equipments (UEs) that derive timing from GNSS, or eNB). There is a need to further configure sidelink grants for resources enabling sidelink communication by efficient mechanisms to ensure reliability and power efficiency.

DETAILED DESCRIPTION

Figure 1:
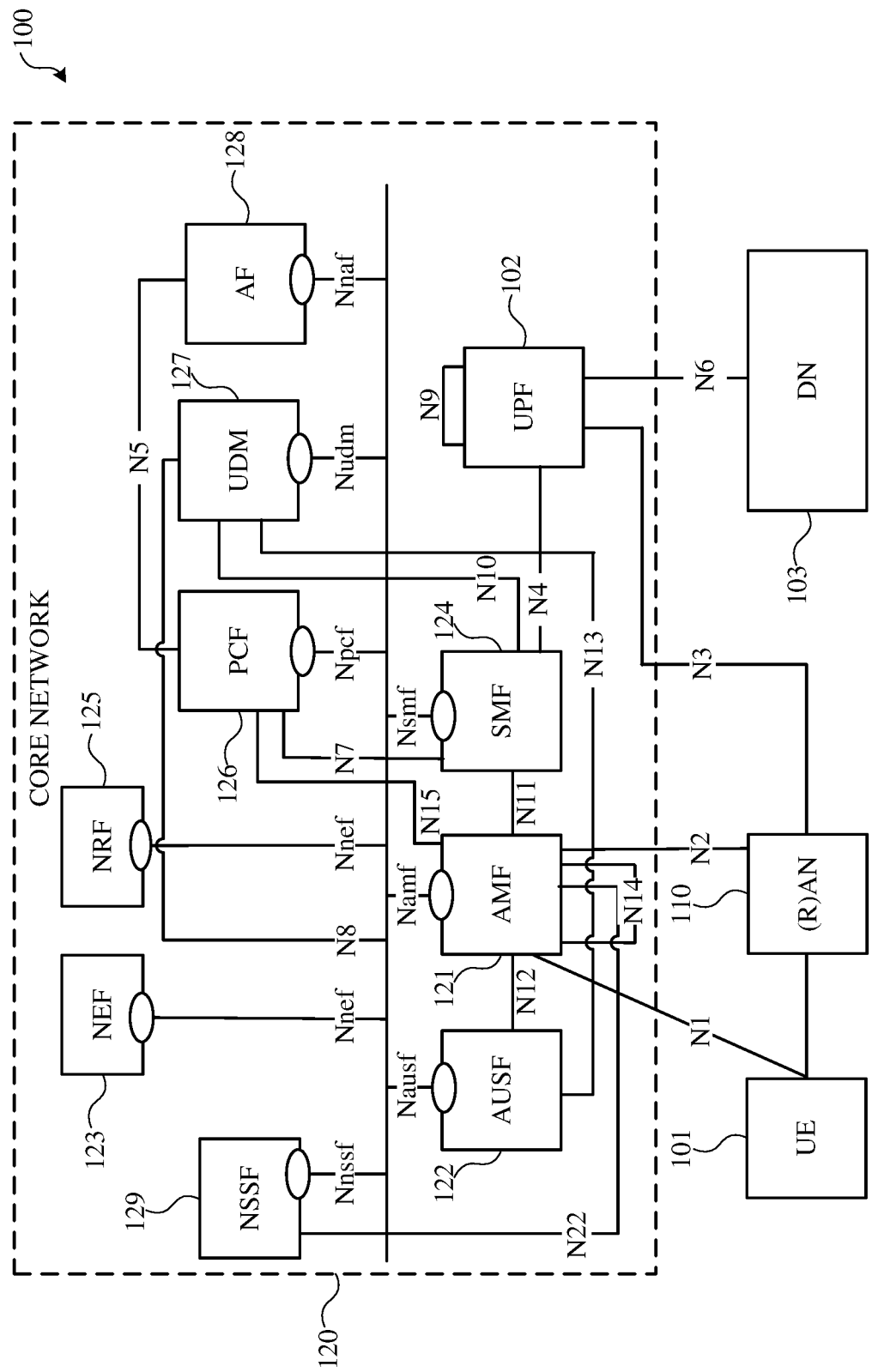
FIG. 1 is a block diagram illustrating an example of user equipment(s) (UEs) and gNBs or access nodes in a network with network components useable in connection with various embodiments (aspects) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various demands for sidelink communication, especially with respect to configuring sidelink grants for resources enabling sidelink communication by efficient mechanisms to ensure reliability and power efficiency, embodiments are described herein. In particular, mechanisms are described for activating and deactivating sidelink grants that allocate resources from the network for sidelink communication among devices. Additional aspects relate to retransmission operations such as deriving a hybrid automatic repeat request (HARQ) process identifier (ID)/number involved in retransmission of a sidelink grant. Other embodiments address the alignment of a size of a DCI format configuration to an existing DCI format in order to further ensure seamlessness in sidelink communication, thereby further enhancing operational goals of reliability and efficiency.

In various embodiments (aspects), a network(ed) device (e.g., a user equipment, a service consumer device, a network node, vehicle or other network component) can store executable instructions that, in response to execution, cause one or more processors on a new radio (NR) network to perform sidelink communication operations. These operations can include receiving downlink control information (DCI) on a physical channel (e.g., physical downlink control channel (PDDCH), or other physical channel) for a sidelink configured grant that enables network resources to be allocated for NR sidelink communication. The device can be configured to generate a determination of whether to activate, release, or generate a retransmit of the at least one sidelink grant based on one or more fields of a DCI format 3_0 configuration of the DCI.

A sidelink grant can be a dynamic grant or a configured grant, for example. A configured grant can be a Type I (one or 1) configured grant or a Type II (2 or two) configured grant. Configured grants of Type II allocate network communication resources based on a grant via physical layer triggering (e.g., DCI format 3_0) for resources from the network, as distinguished from Type one configured grants which are based on RRC signaling, and are referred to herein simply as configured grants. Additional aspects and details of the disclosure are further described below with reference to figures.

FIG. 1 illustrates architecture of a system 100 including a core network (CN) 120 in accordance with various embodiments. The system 100 is illustrated to include a user equipment (UE)/vehicle to everything (V2X) device 101, a radio access network (R)AN 110 or access node (AN), a 5GC 120, and a data network (DN) 103, which can be, for example, operator services, Internet access, or 3rd party services.

The UE (as a V2X, or other network component/device) 101 can comprise one or more of: vehicles (V2V), vehicles and infrastructure (V2I), vehicles and pedestrians (V2P), or other network device(s)/component(s). In various embodiments, one or more of UE configurations, UE provided information, network provided information, and coverage for the UE can be used to select a V2X radio access technology (RAT) for transmission (e.g., dedicated short range communications (DSRC), long term evolution (LTE), 5G, or other RAT). As there are multiple technologies available for V2X communications, some network devices (via the UE 101) can be equipped with these multiple access technologies for V2X communication and utilize sidelink communication according to these technologies.

The 5GC 120 can include an Authentication Server Function (AUSF) 112, an Access and Mobility Function (AMF) 121, a Session Management Function (SMF) 124, a Network Exposure Function (NEF) 123, a Policy Control Function (PCF) 126, a Network Function Repository Function (NRF) 125, a Unified Data Management (UDM) 127, an application function (AF) 128, a user plane function (UPF) 102, and a Network Slice Selection Function (NSSF) 129. Each of these components can be used for processing corresponding 5GC network functions (NFs) or performance measurements related thereto as network functions associated with any one or more of the embodiments herein.

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform Quality of Service (QoS) handling for a user plane (e.g., packet filtering, gating, uplink (UL)/ downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 110 and the AMF 121; and the AMF 121 can be a termination point of Non Access Stratum (NAS) layer (N1) signaling, and perform NAS ciphering and integrity protection.

AMF 121 can also support NAS signaling with a UE 101 over an N3 Interworking Function (IWF) interface. The N3 IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the Access Network (AN) (e.g., Radio Resource Control (RRC) connection or UE-N3IWF connection for non-3GPP access) and the N2 connection for the UE 101 between the AN 110 (e.g., RAN or memory) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 requests, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NSSAIs), if needed. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Figure 2:
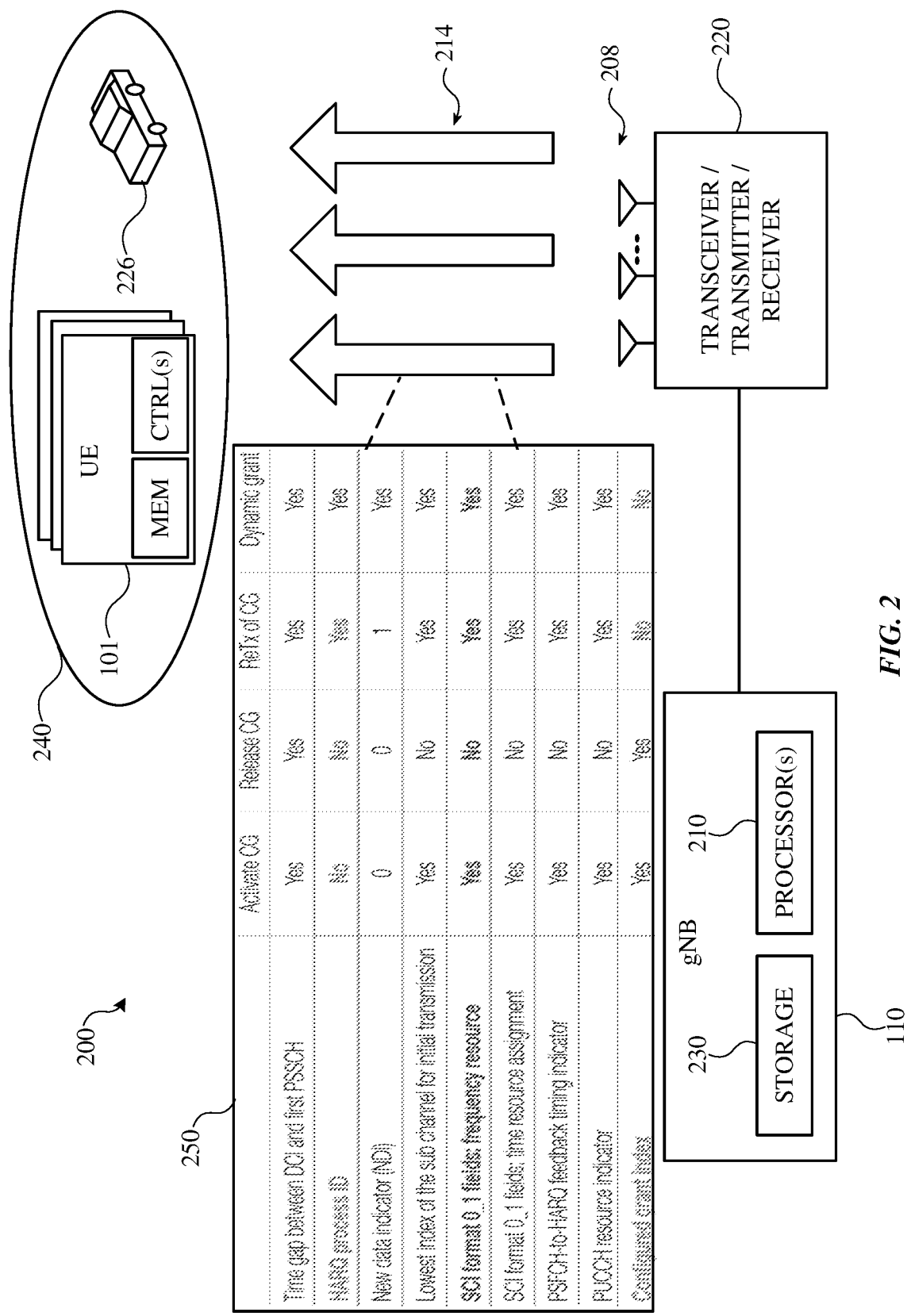
FIG. 2 is a block diagram illustrating a system employable at a UE or gNB, according to various embodiments described herein.

Referring to FIG. 2, illustrated is a block diagram of a system 200 employable at the RAN 110 as a next generation Node B (gNodeB or gNB) or other base station (BS)/Transmit/Receive Point (TRP), or a component of a Third Generation Partnership Project 3GPP network 5G component such as in embodiments herein. System 200 can include processor(s) 210 comprising processing circuitry/component(s) and associated interface(s) (e.g., a communication interface for communicating with communication circuitry 220, a memory interface for communicating with memory 230), communication circuitry 220 (e.g., comprising circuitry for wired and/or wireless connection(s)), transmitter circuitry (e.g., associated with one or more transmit chains) and/or receiver circuitry (e.g., associated with one or more receive chains). This transmitter circuitry and receiver circuitry of transceiver 220 can employ common or distinct circuit elements, or a combination thereof). The memory 230 can comprise any of a variety of storage mediums and can store instructions or data associated with one or more of processor(s) 210 or the communication circuitry 220. Embodiments (e.g., UE embodiments) can similarly comprise processor(s), communication circuitry, and memory in a UE (e.g., a V2X UE or the like) as processor(s) 210, communication circuitry 220, and memory 230 of gNB 110, for example.

In base station (BS) embodiments (e.g., system 200 of a gNB) and network component (e.g., User Plane Function (UPF), etc.) embodiments (e.g., system 200 of a UPF) processor(s) 210 of the gNB, etc.), communication circuitry 220 (etc.), and memory 230 (etc.) can be in a single device or can be included in different devices, such as part of a distributed architecture. In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

The UE 101 can receive V2X configuration information when the UE is authorized to use V2X services over the 3GPP network. This authorization can be done by a V2X function in the core network (e.g., CN 120), and part of the authorization procedure the V2X function can send a list of preferred air interface technologies. Alternatively, or additionally, V2X configuration can be performed by an application server that is not part of the core network 120. The UE 101 can employ one or more channel quality measurements such as power measurements or other measurements related to sidelink communication.

V2X UEs can be in a given coverage area inside a cell covered by an gNB that supports 5G, LTE or DSRC road side unit (RSU) functionality. These UEs can notify the gNB/RSU which V2X communication RAT(s) is/are supported. Based on that information, the network can choose an access technology for the UEs to use. The system 200 can include vehicle/traffic participant entities 240. The vehicle/traffic participant entities 240 include one or more service pedestrian devices (P-UEs) or other UE devices 101, vehicle entities 226 (V-UE), or other network device(s)/component(s). The V2X UE 101 can also include one or more antenna for communications, which include resources for sidelink communications 214 (e.g., DCI) with the vehicle/traffic participant entities or UEs 240.

The vehicle communications between the V2X UE 101 and any vehicle/pedestrian device entities 240 can utilize co-operative awareness that includes information from other vehicles, sensors and the like, to process and share the information to provide vehicle services such as collision warning, autonomous driving, and the like. The V2X UE 101 can be configured to obtain, select or determine QoS attributes associated with sidelink communications. Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, 5G or the like. For example, the frame structure can comprise parameters including sampling rate, frame length, subframe length, subcarrier spacing and cyclic prefix length and can be based on an obtained success ratio.

The sensing operations can be a simplified sensing procedure for V2X UE resource selection aiming to reduce complexity and power consumption. In general, the principles of sensing and resource selection procedure can be used for sidelink communication management. Other embodiments include obtaining the resources for sidelink communication from the network (e.g., via Downlink Control Information (DCI) of a physical channel (e.g., a physical downlink control channel (PDCCH), or the like).

Embodiments herein include various components, configurations, and processes for resource allocation to enable D2D or sidelink communications in one or more UEs 101, V-UEs 226, or other networked devices for direct communication between these devices. In particular, these mechanisms include obtaining resources for sidelink communication via the network (e.g., from the RAN/gNB 110 to any one or more of the devices 240).

The UE 101 or V2X UE 226 can be one or more transmitting (Tx) UEs 240 that can obtain the transmission itself or resources from the network. Three different modes can be enabled by which the network or the gNB 110 provides the Tx UE 240 resources for transmission: A) dynamic grant; B) configured grant Type 1; and C) Configured Grant Type 2. Various differences exist among these different grants for resources to enable sidelink communications. A dynamic grant includes a network component (e.g., RAN 110) providing the Tx UE 240 one resource, or a separate resource for one transport block (TB), one transmission, or one packet of data, for example, which can dynamically be modified for subsequent instances of resource allocation.

Configured grant Type 1 or Type 2 can include scenarios where the network allocates Tx UE 240 periodical resources, in a one shot signaling. Thus, if the UE 101 has some periodic traffic (e.g., traffic that occurs every 1 second), then the network can provide the device resource (e.g., sidelink transmission resource) with a periodicity of one second for multiple times, or as a one-shot allocation for multiple transmissions.

The configured grant Type 1 can comprise higher layer signaling or high-level signals that can include Radio Resource Control (RRC) signaling and result in physical layer signals. In contrast, configured grant Type 2 can be a combination of higher layer signaling and the lower layer signaling. At the higher layer the network is configuring the device with a resource periodicity (e.g., every 1 sec, or other period) with the configured grant Type 2, but it does not change the grant, and it does not give the physical domain of the resource. In particular, the configured grant Type 2 relies on physical layer signaling of a physical channel for resource allocation, such as with the DCI signal of the PDCCH. In the DCI, the network can trigger a configured grant Type 2, and then it can also release the configured grant Type 2 at a time, or after some time.

The activation/deactivation (release) of the configured grant (configured grant Type 2) can be through (via) the DCI. However, the DCI can be used to provide and obtain the dynamic grant in a direct manner as well, which is similar to the configured grant (configured grant Type 2). The DCI provides the high-end, the resource, the frequency resource, a location for the sidelink grant, or other resources.

NR V2X supports sidelink dynamic grant, configured grant Type 1 and configured grant type 2. For a dynamic grant, the DCI can comprise a hybrid automatic repeat request (HARQ) process identifier (ID)/number and a new data indicator (NDI), for example, as shown in the table of the IE fields 250 as part of DCI of a physical channel. The DCI further indicates the time resource allocation and frequency resource allocation with the signaling format to be used for a sidelink control information (SCI). Additionally, a starting sub-channel for initial transmission can be signaled in the DCI for sidelink communication.

An example set of fields of an information element (IE) 250 of the DCI for configured grant (configured grant type 2) and the dynamic grant can be communicated from the gNB 110 to the Tx-UEs 240 and based on the technical specification for 3GPP, TS 38.212, for example. The DCI fields of example IE 250 can be based on DCI format 3_0. This DCI format for NR/5G, DCI format 3_0, can include one or more of: a time gap; HARQ process ID; new data indicator (NDI); lowest index of the sub-channel allocation to the initial transmission; SCI format 0_1 fields including: frequency (domain) resource assignment (FRA or FDRA) and time resource assignment; physical sidelink feedback channel (PSFCH)-to-HARQ feedback timing indicator; a physical uplink control channel (PUCCH) resource indicator; Configuration index or configured grant index, or the like.

The DCI format 3_0 includes the DCI fields 250 for the gNB 110 to control NR/5G sidelink. For 5G release 16 ultra-reliable and low latency communications (URLLC), the maximum that the uplink (UL) configured grant (CG) per bandwidth part (BWP) is supported and the maximum number can be 12, for example. As such, in various embodiments the configured grant can include an UL configured grant, but may also include a downlink (DL) semi-persistent grant. The fields of the DCI format 3_0 (e.g., DCI fields 250) can be utilized to release multiple configured grants in a single DCI. Further, a single DCI can be utilized to activate a single configured grant, as well as release multiple configured grants. Although the embodiment configures a release of multiple configured grants, a release of a single configured grant could also be envisioned as well as an activation of multiple configured grants as discussed herein.

In various other embodiments, the Tx UE 101 can be configured for activating and deactivating one or more sidelink configured grants (e.g., configured grant Type 2) that allocate resources from the network for sidelink communication among devices 240 based on the DCI format 3_0, including the IE fields 250, for example. Additional aspects relate to retransmission operations such as deriving the HARQ process ID involved in retransmission of a sidelink grant based on a dynamic grant; where each sidelink grant (dynamic grant/configured grant) is configured based on different Radio Network Temporary Identifiers (RNTIs), respectively, and type of grant, dynamic or configured grant, can be distinguished/based on different Radio Network Temporary Identifiers (RNTIs), respectively, regardless of whether the configured grant retransmission is based on the dynamic grant fields. In other words, the configured grant continues to be configured based on a configured grant RNTI, and the dynamic grant on a dynamic grant RNTI as a different RNTI from the configured grant, regardless of a configured grant transmission being based on a dynamic grant.

Other embodiments address a calculation of the HARQ process ID for a configured grant, especially for retransmission operations, and the alignment of a size of a DCI format configuration to an existing DCI format. These processes for sidelink communication can be based on the DCI format 3_0 with the fields 250 of DCI for improving operational goals in sidelink communication, including reliability and efficiency in resource allocation by configured grants, as generally referred to as Type 2 configured grants herein, and dynamic grants, or in other words grants based on DCI or control information directly from the network specifically.

In an embodiment, the DCI format 3_0 (e.g., of DCI fields 250) can provide a common DCI size for the dynamic grant and the configured grant. Additionally, some fields of the DCI format 3_0 of DCI fields 250 can be applicable to a dynamic grant only, while others applicable to the configured grant. For example, the "HARQ process ID" field and the NDI field of DCI fields 250 of an IE of the DCI can be used specifically for resources involved in the dynamic grant. Other fields (e.g., the configured grant index field) can be applicable for a configured grant. In an aspect, the modulation and coding scheme (MCS) and the redundancy version (RV) fields are not configured here in DCI format 3_0 for the dynamic grant and configured grant.

In the particular DCI fields 250, an abbreviated table is further demonstrated to indicate the different categories of operations and how each field can be applicable to a particular operation, including activation, deactivation (release), and retransmission of a configured grant, as well as a column for applicability to the dynamic grant. A list of fields is provided in the first column from left, and moving from left to right demonstrates these different operations: activation of configured grant, deactivation of configured grant, retransmission of configured grant, and the dynamic grant application. All fields can be used for the dynamic grant, except the configured grant index, for example.

In particular, the configured grant can be obtained by different types of DCI, one to activate it and another to deactivate it, as demonstrated in the second and third columns, while the fourth column is applicable to a retransmission of the configured grant.

The fields 250 of the table that the network provides resources for the configured grant. For example, a periodicity of one second, or other time period. However, if not communicated successfully, then a retransmission of that TB after one occasion of the transmission for the configured grant can be initiated. The retransmission of the configured grant can be configured or generated using the dynamic grant according to aspects. Although this resource allocation is a configuration of a dynamic grant, it is for the retransmission of a configured grant. A difference between the retransmission of a configured grant and a dynamic grant is that in the retransmission of a configured grant the RNTI for the configured grant is still utilized. In particular, two different RNTI's are utilized, one is for the configured grant and one for the dynamic grant, both different from one another so that each of the sidelink grants can be distinguished through different RNTI (e.g., a sidelink (SL)-RNTI or other type). However, even though the data is for the retransmission of the configured grant, although it is in the form of the dynamic grant, it is based on the RNTI for the configured grant, and thus configured for the retransmission of the configured grant.

In aspect, for configured grant retransmissions as well as for a dynamic grant, the network indicates to the gNB 110 or to the UE 101 via the gNB 110 which grant is for which via the HARQ process ID, which is a "yes" for the last two columns of this row associated with the HARQ process ID field of fields of table 250 in an IE of DCI format 3_0. However, the HARQ field is not needed for activation/release of the configured grant, indicated by a "no" in the second and third column of the table 250 for the HARQ process ID.

In another aspect, the SCI format 0_1 field of frequency resource "assignment" (FRA) field is not utilized for release, whereas for activation of the configured grant, retransmission of the configured grant, and the dynamic grant it is. Further, the configured grant index could be utilized for the activation of the configured grant, (indicated by "yes) in order to provide which configured grant is to be activated, as well as for release of the configured grant. For the dynamic grant of the retransmission of the configured grant, the configured grant index is not utilized because multiple configured grant indices can be configured, but the configured grant index is utilized when activating the configured grant.

In an embodiment, a single sidelink configured grant can be triggered by a single DCI to activate or release only a single sidelink configured grant. The grant configuration can be indicated via RRC signaling, also indicating periodicity, while the DCI can be used to activate or release the configured grant. The gNB 110 communicates DCI via a physical channel for activation or release of a configured grant at one or more network devices 240, for example, by configured DCI format 3_0. Activation of the configured grant can be based on a validation of DCI format 3_0 being achieved by the "HARQ process ID" field. For example, the UE 101 can process the DCI format 3_0 to determine whether the HARQ process ID bits all have a same state or value. For example, a UE 101 can determine whether the HARQ process ID field is configured with all zeros (0's) as a predefined value, for example, and if yes then operate to activate configuration of the configured grant for sidelink communication based on the DCI format 3_0 obtained.

In another embodiment, for a release (deactivation) operation of a sidelink grant, the gNB 110 can configure the configured grant in DCI format 3_0 and the UE 101 process the configured grant from the DCI format 3_0 based on both a validation of DCI format 3_0 being achieved by the "HARQ process ID" and "SCI format 0_1 field of frequency (domain) resource assignment" fields. The UE 101 can be configured to determine whether to release/deactivate a sidelink grant based on a value of the HARQ process ID. For example, the UE 101 can process the DCI format 3_0 to determine whether the HARQ process ID bits all have a same state or value. For example, the HARQ process ID could have all zeros (0's). Release can be controlled by a combination of the HARQ process ID and the SCI format 0_1 field of "frequency resource assignment (FRA)" fields, and thus if the HARQ process ID comprises bits of a particular value and the SCI format FRA field also comprises bits of a particular value, then a release of the sidelink grant (e.g., the configured grant) can be initiated by the UE 101. The SCI format 0_1 field of "frequency resource assignment", for example, can have bits of a same state (e.g., all 1's) as a different same state than the HARQ process ID. For example, if the HARQ process ID comprise a same first state (e.g., all zeros, 0's), while the SCI format 0_1 field of "frequency resource assignment" comprises a same second state (e.g., all ones, 1's), then the configured grant can be released or deactivated based on the DCI format 3_0.

The SCI format 0_1 field of "frequency resource assignment" is configured to indicate the start sub-channel of a second resource and a third resource, for example, as well as the number of the sub-channel size. If the maximum number of resources is 2, for example, SCI format 0_1 field has $$\left\lceil \log_2\left(\frac{N(N+1)}{2}\right) \right\rceil \text{ bits,}$$

where N is the total number of sub-channels in a resource pool. If the maximum number of resources is 3, the SCI format 0_1 field can have $$\left\lceil \log_2\left(\frac{N(N+1)(2N+1)}{6}\right) \right\rceil \text{ bits.}$$

For any integer value of N, either $$\frac{N(N+1)}{2} \text{ or } \frac{N(N+1)(2N+1)}{6}$$

is not a power of 2. In particular, this enable a configuration of the frequency resource indication value design to be able to avoid the all 1's, while retaining its intended function. Thus, for example, all 1's could be reserved to indicate a release of configured grant, and defined as such for processing deactivation of the configured grant by the UE 101.

In another embodiment, multiple sidelink configured grants can be triggered in the DCI format 3_0 by the network via the gNB 110 to UE 101 with a sidelink grant for sidelink communications. The IE of the DCI can comprise one or more than one configured grant configuration, which can be based on a URLLC configuration or other configuration for sidelink communication. For example, a single DCI can be used to activate one configured grant. To activate multiple configured grants, multiple DCIs can be configured, but there are at least two embodiments for this as further described below. In one, a single DCI or field of the DCI format 3_0 can be used is to release a single configured grant. Alternatively, or additionally, as a second case a single DCI can be configured to release multiple configured grants in one shot (or one signaled resource transmission).

In an embodiment, for example, a single DCI can be configured to activate a single sidelink configured grant or release one or more sidelink configured grants. The configuration grant index field can be avoided by using other fields of the fields 250 based on the DCI format 3_0. For activation of a configured grant the HARQ process ID field of the fields 250, for example, can be used as an indication or to indicate the configured grant index information as a way to indicate the index of the sidelink configured grant to be activated. Although a size of the HARQ process ID field may not be specifically defined for the bit size, the network via the gNB 110 can define a size variable as size M. Then the size can be indicated or configured as being up to $\log_2$ M for a ceiling number of bits, as a bit number for the configured grant. For example, a twelve, ten or other number for M can be selected for the configured grant configuration. Thus, four bits can be used to indicate ten as M for the sidelink configured grant, and determined as $\log_2$ of 10, for the representation $\log_2$ M. This is one example, and thus, using this example the HARQ process ID field could be four bits long.

In one embodiment, up to 16 can be used as M for the configured grant configuration. In particular, the HARQ process ID of the DCI format 3_0 can be configured in this way to indicate the configured grant, and to indicate which index of the sidelink configured grant is being activated. If the maximum configurable number of sidelink configured grants is M, then $\log_2$ M bits can used to indicate the sidelink configured grant index. If $\log_2$ M is less than the bit length of HARQ process ID, then the least (or the most) significant $[\log_2(M)]$ bits of the HARQ process ID can be used to indicate the index of sidelink configured grant to be activated.

In another embodiment, for example as the second case above, the HARQ process ID field can be used to indicate the release of multiple configured grant simultaneously or concurrently. Here, an independent or separate table can be configured so that the HARQ process ID field can be utilized to indicate an entry of the table. Each table can have at least one entry and each entry of the table comprise a plurality of configured grant indices. Thus, the HARQ process ID field can be configured to point to a table entry, indicating which entry of the table is pointed to. If this entry comprises multiple configured grant indices, then all the associated configured grants would be released. The UE 101 can be configured with this mechanism to process (e.g., via one or more processors) the release of multiple configured grants simultaneously.

The gNB 110 can thus provide for release operations of multiple sidelink grants by the DCI format 3_0 configuration. A separate table from table 250 can be configured for each entry indicating one or multiple sidelink configured grant indices. If the bit length of "HARQ process ID" field could be represented as X, then the table can have up to $2^X$ entries. The "HARQ process ID" field can thus indicate a table entry of associated sidelink configured grants that are to be released from activation or use in sidelink communications.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 3:
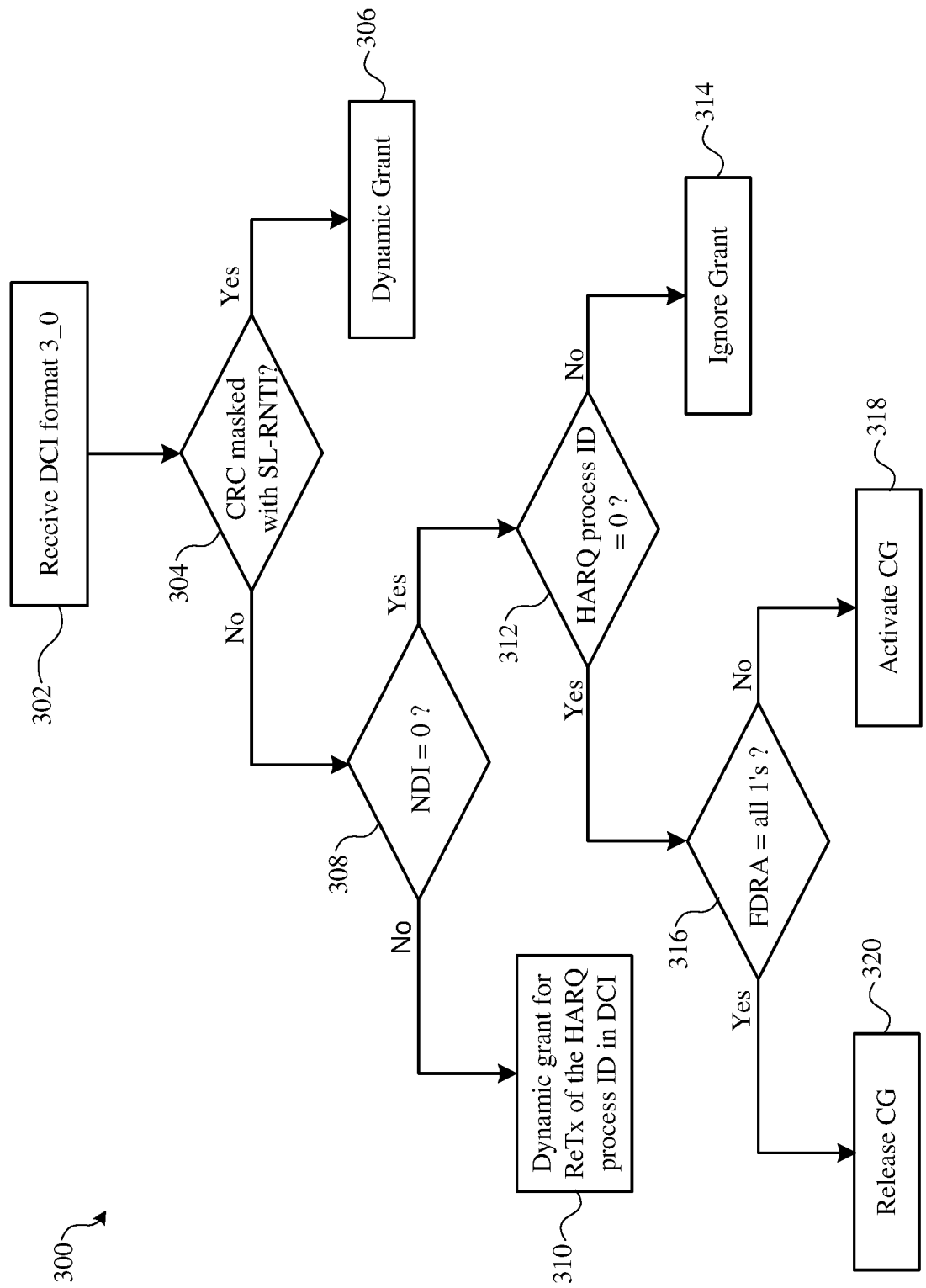
FIG. 3 is an example process flow for processing downlink control information (DCI) format 3_0 in a single sidelink configured grant configuration according to various embodiments described herein.

Referring to FIG. 3, illustrated is an example process flow 300 for processing or configuring DCI format 3_0 for sidelink communications, especially with respect to a single sidelink grant. At 302, for example, a UE or other networked device (e.g., V2X or networked component) can receive a DCI as a DCI format 3_0 configuration for processing operations related to a sidelink grant for sidelink communication. As described above, the DCI format 3_0 comprises fields (e.g., fields of sample table 250 of FIG. 2) to be utilized for a dynamic grant or a configured grant (configured grant Type 2).

At 304, a determination is made upon decoding the DCI whether the cyclic redundancy check (CRC) is masked with an SL-RNTI. If the determination 304 concludes in the affirmative ("yes"), then the process flows to 306 for processing a dynamic grant. If the determination 304 concludes in the negative ("no"), then the process flows to a determination 308 for determining further whether an NDI of the received DCI format 3_0 comprises one or more zeros, or other predefined value.

If determination 308 is "no", then the process flows to 310 for processing a dynamic grant for retransmission (reTx) of the HARQ process ID in DCI. If the determination 308 is "yes", then the process flows to an additional determination at 312 for determining whether the HARQ process ID comprises bits equal to a predefined value or a first same value (e.g., all zeros, or the like). If the determination 312 is "no", then the grant is ignored, but if "yes", then the process flows to 316 for an additional further determination to determine whether a frequency (domain) resource allocation (FDRA/FRA) comprises bits equal to another predefined value or a second different same value (e.g., all 1's, or the like).

If the determination at 316 with the FDRA (e.g., SCI format 0_1 fields including: frequency (domain) resource assignment (FRA or FDRA) and time resource assignment) is "yes", then a release of a configured grant is performed at 320 based on the fields (e.g., 250) of the DCI format 3_0. If the determination at 316 is "no", then an activation of the configured grant is performed based on the fields of the IE of the DCI in the physical channel. The process flow 300 then concludes for operations associated with and enabling the configuration of sidelink communications with a particular sidelink grant (e.g., dynamic grant and configured grant Type 2/II).

Figure 4:
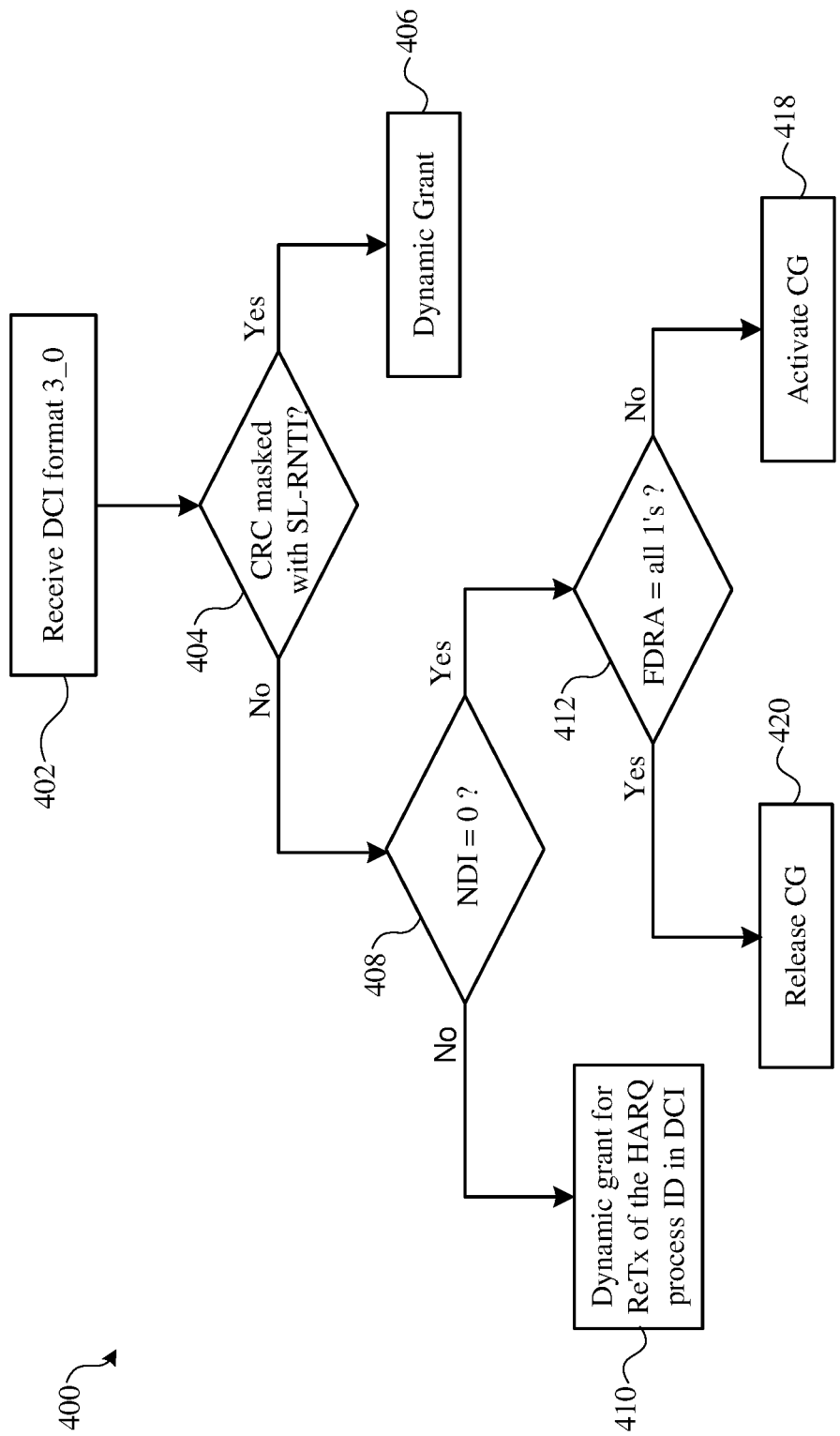
FIG. 4 is another example process flow for processing DCI format 3_0 of multiple sidelink configured grant configurations according to various embodiments described herein.

Referring to FIG. 4, illustrated is another example process flow 400 for processing or configuring DCI format 3_0 for sidelink communications, especially with respect to a configuration of multiple sidelink grants. Process flow acts 402 thru 410 can be similar to acts 302 thru 310 of process flow 300 of FIG. 3 above. In particular, process flow 400 can be configured utilize a separate table for a multiple configured grant configuration as discussed in this disclosure with a HARQ process ID field. An independent or separate table can be configured and the HARQ process ID field can be utilized to indicate an entry of the table. The table can have at least one entry and each entry of the table comprise a plurality of configured grant indices. The "HARQ process ID" field can be configured to indicate a table entry of associated sidelink configured grants that are to be released from activation or use in sidelink communications.

At 402, a UE or other networked device (e.g., V2X or networked component) can receive a DCI as a DCI format 3_0 configuration for processing operations related to sidelink grants for sidelink communication. As described above, the DCI format 3_0 comprises fields (e.g., fields of sample table 250 of FIG. 2) that can be utilized for one or more dynamic grants or configured grants (configured grant Type 2).

At 404, a determination is made upon decoding the DCI whether the cyclic redundancy check (CRC) is masked with an SL-RNTI. If the determination 304 concludes in the affirmative ("yes"), then the process flows to 406 for processing a dynamic grant without use of the configuration index field, or by using a different field than the configuration index field to indicate the configuration index(ices) (e.g., the HARQ process ID field, or other field of the DCI format 3_0). If the determination 404 concludes in the negative ("no"), then the process flows to a determination 408 for determining further whether an NDI of the received DCI format 3_0 comprises one or more zeros, or other predefined value.

If determination 408 is "no", then the process flows to 410 for processing a dynamic grant for retransmission (reTx) of the HARQ process ID in DCI without use of the configuration index field, or using a different field than the configuration index field to indicate the configuration index (ices). If the determination 408 is "yes", then the process flows to an additional determination at 412 for determining whether a frequency (domain) resource allocation (FDRA/FRA) comprises bits equal to another predefined value or a second different same value (e.g., all 1's, or the like). If the FDRA is equal to all ones then that indicates to release a configured grant at 420, and the configured grant indices (index) can be equal or equivalent to the HARQ process ID field. For the activation of the configured grants at 418 the HARQ process ID field provides which configured grant is to be activated. The configured grant index is not used via these processes in order to avoid use of it for the configured grants. In particular, the process flow 400 of FIG. 4 is avoiding the configured grant index field and also utilizing the FDRA field to distinguish between release and activation of the configured grant(s).

Figure 5:
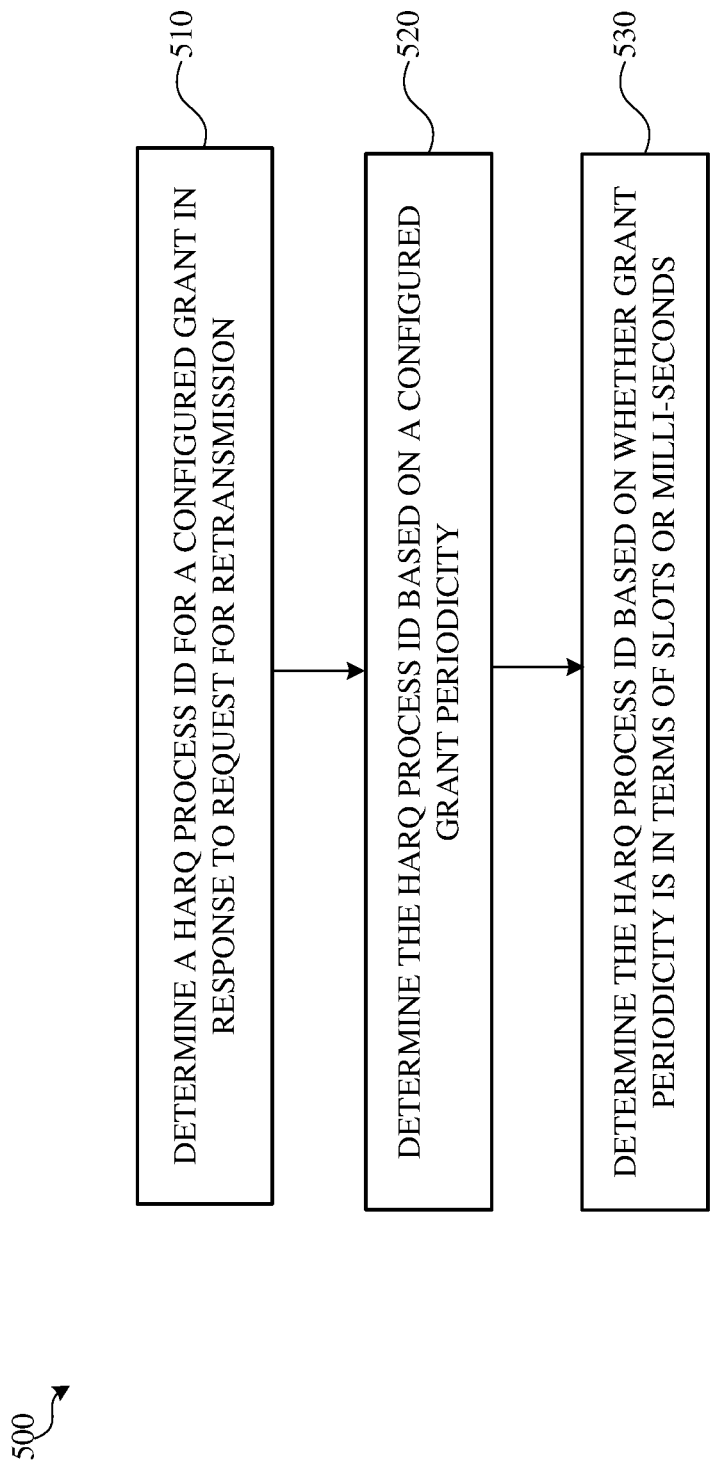
FIG. 5 is an example process flow for determining hybrid automatic repeat request (HARQ) process ID for processing DCI format 3_0 according to various embodiments described herein.

Referring to FIG. 5, illustrated is an example process flow 500 for determining a HARQ process ID for a configured grant. Embodiments for the UE 101, the gNB 110 or other network component to process via one or more processing components can include determining at 520 via one or more processors the HARQ process ID for a configured grant. In some instances, the HARQ process ID can be calculated where for a transmission occasion/opportunity of a configured grant, the transmission failed. Then the UE 101 can process and provide a report to the network to request a retransmission by the network via the gNB 110, and in response the network can provide the retransmission grant.

A retransmission for the configured grant can be triggered in terms of, or a function of the dynamic grant, which is also provided the HARQ process ID in the HARQ process ID field of DCI format 3_0. A network component (e.g., gNB 110) can indicate to the UE 101 that a sidelink grant is for a configured grant with a transmit block (TB) that is associated with the HARQ process ID, for example. The HARQ process ID may not be directly known to the network (e.g., the gNB 110). Because this is a configured grant, a multiple transmission could be associated with the sidelink grant, thus the gNB 110 or other network component can calculate the HARQ process ID that the Tx UE (e.g., UE 101/240) utilizes.

In an embodiment, the HARQ process ID can be calculated for retransmission of a configured grant that is based on a first RNTI via a dynamic grant with a different RNTI. The calculation of the HARQ process ID can be based on a configured grant periodicity at 520. For example, the configured grant periodicity can be in terms of slots or milli-seconds. The calculation of the HARQ process ID at 530 can be further determined depending on whether the configured grant periodicity is in terms of slots or milli-seconds.

In an embodiment, sidelink transmission can be defined in terms of, or in units of slots at 530. For example, the HARQ process ID can be determined depending on whether the grant periodicity is in terms of slots or milliseconds. Unlike uplink configured grants where periodicity is in symbols, sidelink configured grant periodicity can be in a slot level or in a milli-second level as with DL semi-persistent scheduling (SPS). Because not every slot may be available in sidelink communications for a configured grant, although it has a certain periodicity (e.g., one second or other duration), after a period the resource of a slot may not be available for the UE sidelink transmission. Then when the configured grant is provided in terms of slots, the configured grant periodicity can be configured in terms of logical slots instead of in terms of physical slots. A logical slot can mean all the slots available for sidelink transmission to ensure a contiguous time.

In another embodiment, where the configured grant periodicity is in units of milli-seconds, then a first logical slot after a period can be used for determining/defining the HARQ process ID for the configured grant. In case of the millisecond or absolute value of the time (e.g., milliseconds or seconds), although the configured grant indicates that this configured grant is every second, or other duration, it could be that after one second this resource is not available for the sidelink transmission; as it may be available for the downlink transmission, for example, or other resource. Therefore, although the configured grant provides the periodicity of millisecond(s), then for the configured grant if that slot is not available then the first available, or the first logical slot after the period can be utilized or defined for use. For example, after one second a resource may not be available, then the first slot after this one second is used for the configured grant, which can account for error case handling. Alternatively, or additionally, the sidelink transmission is suspended for a period if the corresponding slot is not available for sidelink transmissions. The HARQ process ID may be skipped accordingly.

In other embodiments, when a network node or gNB 110 assigns the configured grant, it can indicate how many HARQ process IDs are to be used as a number, but does not necessarily provide the HARQ process ID values. For example, the gNB 110 can provide the UE device 101 a particular count for use. For example, the network could indicate a number as two HARQ process IDs or three HARQ process IDs, for example, but does not necessarily indicate an exact number of a particular HARQ process ID. Thus, in one embodiment is to indicate exactly for a configured grant which HARQ process IDs are associated for use for sidelink communication at the UE 101. For example, the network could indicate that this configured grant can use the HARQ process ID number 3, 4, 5, for example. As such, a bitmap, data set, or table could be provided indicating which HARQ process IDs are associated with the configured grant for use in sidelink communication.

Alternatively, or additionally, a range of values could be provided, such as, for example, for example, the number 3, 4, 5 HARQ process IDs could be indicated by providing the minimum HARQ process ID as 3 and the maximum as 5 for a range to be indicated. So here it gives you the range. Thus, here are two ways of determining a HARQ process ID instead of providing the exact HARQ process ID numbers, rather providing how many HARQ process IDs can be used for a particular configured grant in varied embodiments.

Other embodiments include the HARQ process ID calculation based on a grant HARQ ID that is derived from a direct frame number (DFN). If the HARQ process ID is based on a unit of slots, which are being used for transmitting, then a grant HARQ ID can be determined according to the representation: Grant HARQ ID=[floor(CURRENT_slot/periodicity)] modulo nrofHARQ-Processes as defined in the Uu link. If the HARQ process ID is configured in milli-seconds then the Grant HARQ ID can be determined according to the representation: Grant HARQ ID=[floor(CURRENT_slot×10/(numberofslotsPerFrame×periodicity))] modulo nrofHARQ-Processes. Here, the "CURRENT_slot" can be equal to [DFN*numberofslotsPerFrame+slot number in frame], or [SFN*numberofslotsPerFrame+slot number in frame], where DFN is the direct frame number and SFN is system frame number. The HARQ process ID calculation is applicable to both sidelink and Uu link with multiple active configured grants. Here the DFN is the direct frame number, which is used for the sidelink, and SFN is the system frame number, which is used in the main link from eNB 110 to UE 101. In this embodiment, as sidelink is communication from UE device 101 to another UE device (e.g., 226), the DSN can be used to calculate a grant HARQ ID for further determining or deriving the HARQ process ID with the grant HARQ ID.

A grant HARQ ID indicates which HARQ index is within a sidelink grant. For example, a grant could assign the HARQ process ID from 3 thru 5 in number, this grant HARQ ID can be mapped to the HARQ process ID. For example, a one-to-one mapping can be configured between the grant HARQ ID and HARQ process ID. If the configured grant has a bitmap of HARQ process IDs, the HARQ process ID can be associated with the i-th bit of value 1 in the bitmap, where i is equal to the "grant HARQ ID". If the configured grant has a range of HARQ Process IDs, then the HARQ Process ID can be equal to the sum of "grant HARQ ID" and the configured "minimum HARQ process ID", for example.

In other embodiments, at least one of the DCI format 3_0 size, or the DCI format 3_1 size can be aligned to an existing DCI format size (e.g., in slots, time, BWP, or other resource parameter). The DCI format 3_1 can be configured for the NR Uu link to control LTE sidelink. DCI format 3_0 and DCI format 3_1 can be configured from the gNB 110 or 5G network to control the UE device. DCI format 3_0 is configured to control 5G sidelink communication and DCI format 3_1 is configured to control the LTE sidelink. In particular, the DCI format 3_0 as well as the DCI format 3_1 can be aligned based on a size of an existing DCI format size.

In an embodiment, the gNB 110 can configure an alignment of DCI format 3_0 and/or DCI format 3_1 size to an existing DCI format size according to a fixed size or a configurable size that can be dynamically configured at different times or for different DCI transmissions. For example, the DCI format 3_0 or DCI format 3_1 can be aligned in size according to a fixed alignment to DCI format 0_0 or 0_1.

Alternatively, or additionally, one or more of the DCI format 3_0 or DCI format 3_1 can be aligned in size according to a fixed alignment to DCI format 0_2, which itself is configurable. DCI format 0_0 can have a similar size to DCI format 3_0, while DCI format 0_2 size can be configurable, and be smaller than that of DCI format 0_0. Thus, the DCI format 3_0 size could be configured to be similar to DCI format 0_2.

Alternatively, or additionally, DCI format 3_0 or DCI format 3_1 sizes can be configurably aligned to DCI format 0_0, DCI format 0_1, DCI format 0_2, or a combination thereof in sequence. Thus, based on another DCI format configuration, DCI format 3_0 or 3_1 can be fixedly or configurably defined.

Alternatively, or additionally, the size alignment of DCI format 3_0 or DCI format 3_1 can be configured based on a maximum number of reserved resources for sidelink transmission. For example, up to three resources could be allocated for sidelink, and the sizes of DCI format 3_0 or DCI format 3_1 can be different if three versus two resources are reserved for sidelink. If a maximum number of reserved resources for sidelink transmissions is 2, then the DCI format 3_0 or DCI format 3_1 can be aligned to smaller DCI format such as DCI format 0_2. If a maximum number of reserved resources for sidelink transmissions is 3, then DCI format 3_0 or DCI format 3_1 sizes can be aligned to DCI format 0_0 or 0_1.

Alternatively, or additionally, DCI format 3_0 or DCI format 3_1 sizes can be aligned to an uplink grant starting from zero, but could also be aligned to the downlink format grants (e.g., DCI formats 1_0, 1_1 and 1_2) as an extension to the embodiments above and herein.

Figure 6:
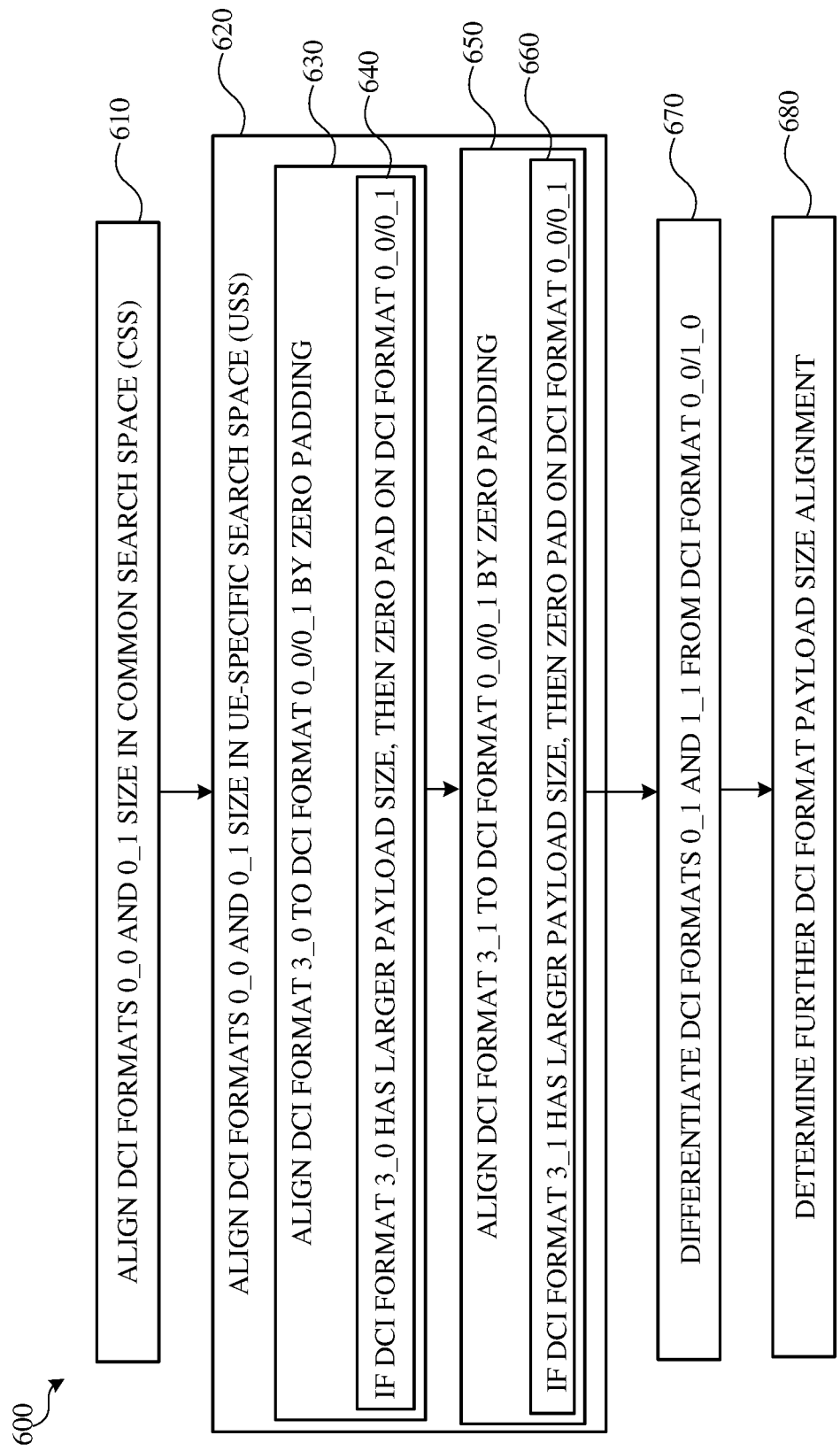
FIG. 6 is an example process flow for aligning DCI format 3_0/3_1 according to various embodiments described herein.

Referring to FIG. 6, illustrated is an example process flow 600 for aligning DCI format 3_0 or format 3_1 sizes to another DCI format for sidelink communication. The process flow 600 can initiate, and at 610 comprise aligning DCI formats 0_0 and 0_1 size in a common search space (CSS).

At 620, the process flow comprises aligning DCI formats 0_0 and 0_1 size in UE-specific search space (USS). In an embodiment at 630, DCI format 3_0 can be aligned to DCI format 0_0/0_1 by zero padding, if DCI format 3_0 is monitored. At 640, if DCI format 3_0 has larger payload size, then zero padding can be performed on DCI format 0_0/0_1; otherwise, zero padding can be conducted on DCI format 3_0. Alternatively, or additionally, at 650 DCI format 3_1 can be aligned to DCI format 0_0/0_1 by zero padding, if DCI format 3_1 is monitored but DCI format 3_0 is not monitored. At 660, if DCI format 3_1 has larger payload size, then zero padding can be performed on DCI format 0_0/0_1; otherwise, zero padding can be performed on DCI format 3_1.

At 670, the process flow 600 further comprises differentiating DCI formats 0_1 and 1_1 from DCI format 0_0/1_0. DCI formats 0_2 and 1_2 can further be differentiated from DCI format 0_0/1_0.

At 680, the process flow 600 further comprises determining if further DCI format payload size alignment is to be performed by re-aligning. If further alignment, or re-alignment is desired, then DCI formats 0_0 and 0_1 size can be re-aligned. DCI format 3_0 to DCI format 0_0/0_1 can be further aligned by zero padding, if DCI format 3_0 is monitored, similar to the act(s) at 630. DCI format 3_1 to DCI format 0_0/0_1 can be further aligned by zero padding, if DCI format 3_1 is monitored but DCI format 3_0 is not monitored, similar to the act(s) at 650. DCI formats 0_2 and 1_2 size can also be further aligned, as well as DCI formats 0_1 and 1_1 size by re-aligning.

Alternatively, or additionally, as stated above, it will be appreciated that the illustrated ordering of such acts or events are not to be interpreted in a limiting sense. For example, some acts may occur in different orders and/or concurrently with other acts or events apart from those illustrated and/or described herein. In one example, re-aligning of DCI format 3_0/DCI format 3_1 to DCI format 0_0/0_1 can be further aligned by zero padding, before or after the DCI formats 0_2 and 1_2 size is re-aligned.

Figure 7:
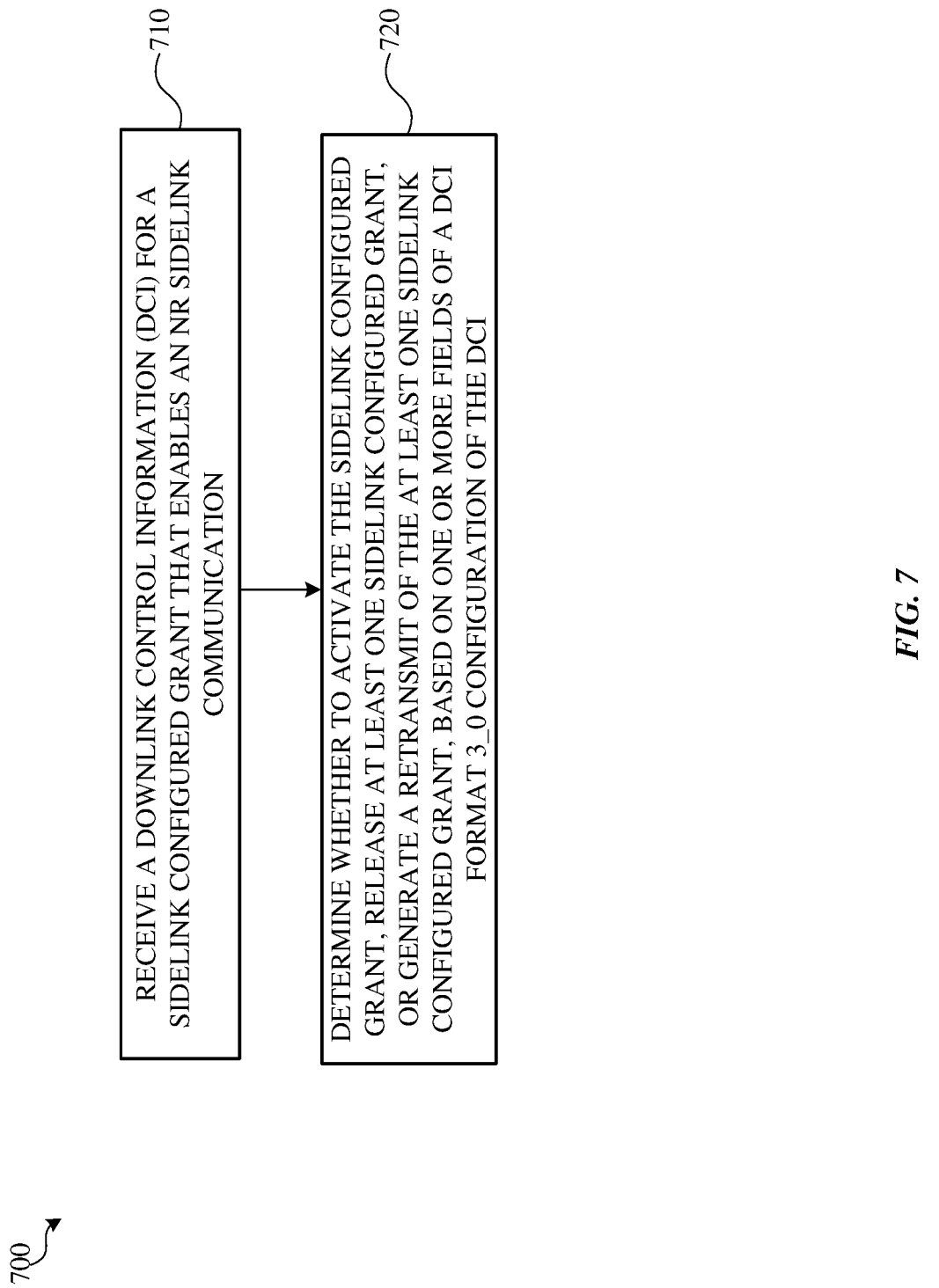
FIG. 7 is a block diagram illustrating an example process flow for configuring sidelink communications according to various embodiments described herein.

Referring to FIG. 7, illustrated is an example process flow for a network device or component (e.g., UE 101, or other network component) to perform operations for sidelink grant to enable sidelink communications among UE devices.

At 710, the process flow 700 initiates with receiving/processing a downlink control information (DCI) for a sidelink configured grant that enables an NR sidelink communication.

At 720, the process flow 700 further comprises determining whether to activate the sidelink configured grant, release at least one sidelink configured grant, or generate a retransmit of the at least one sidelink configured grant, based on one or more fields of a DCI format 3_0 configuration of the DCI.

In various embodiments herein, the process flow 700 can further comprise determining whether to generate a retransmission operation or generate a further determination of whether to generate an activation operation or a release operation, based on a new data indicator (NDI) field of the DCI format 3_0 configuration.

In various embodiments herein, the process flow 700 can further comprise generating the activation operation of the sidelink configured grant based on a hybrid automatic repeat request (HARQ) process ID field of the DCI format 3_0 configuration.

In various embodiments herein, the process flow 700 can further comprise generating the release operation of the sidelink configured grant based on a sidelink control information (SCI) format 0_1 field for frequency resource assignment of the DCI format 3_0 configuration and the HARQ process ID field.

In various embodiments herein, the process flow 700 can further comprise releasing the at least one sidelink configured grant and activating the at least one sidelink configured grant based on a HARQ process ID field of the DCI format 3_0 configuration and a frequency (domain) resource assignment field of sidelink control information (SCI) format 0_1. The HARQ process ID field can be equal to a sidelink configured grant index, or indicate an entry of a data set, a bitmap or a table that comprises one or more sidelink configured grant indices.

In various embodiments herein, the process flow 700 can further comprise determining whether to initiate a retransmission operation for a retransmission of the sidelink configured grant based on a field of the DCI format 3_0 configuration that is applicable to a sidelink dynamic grant. The sidelink configured grant is based on a different RNTI than the sidelink dynamic grant.

Figure 8:
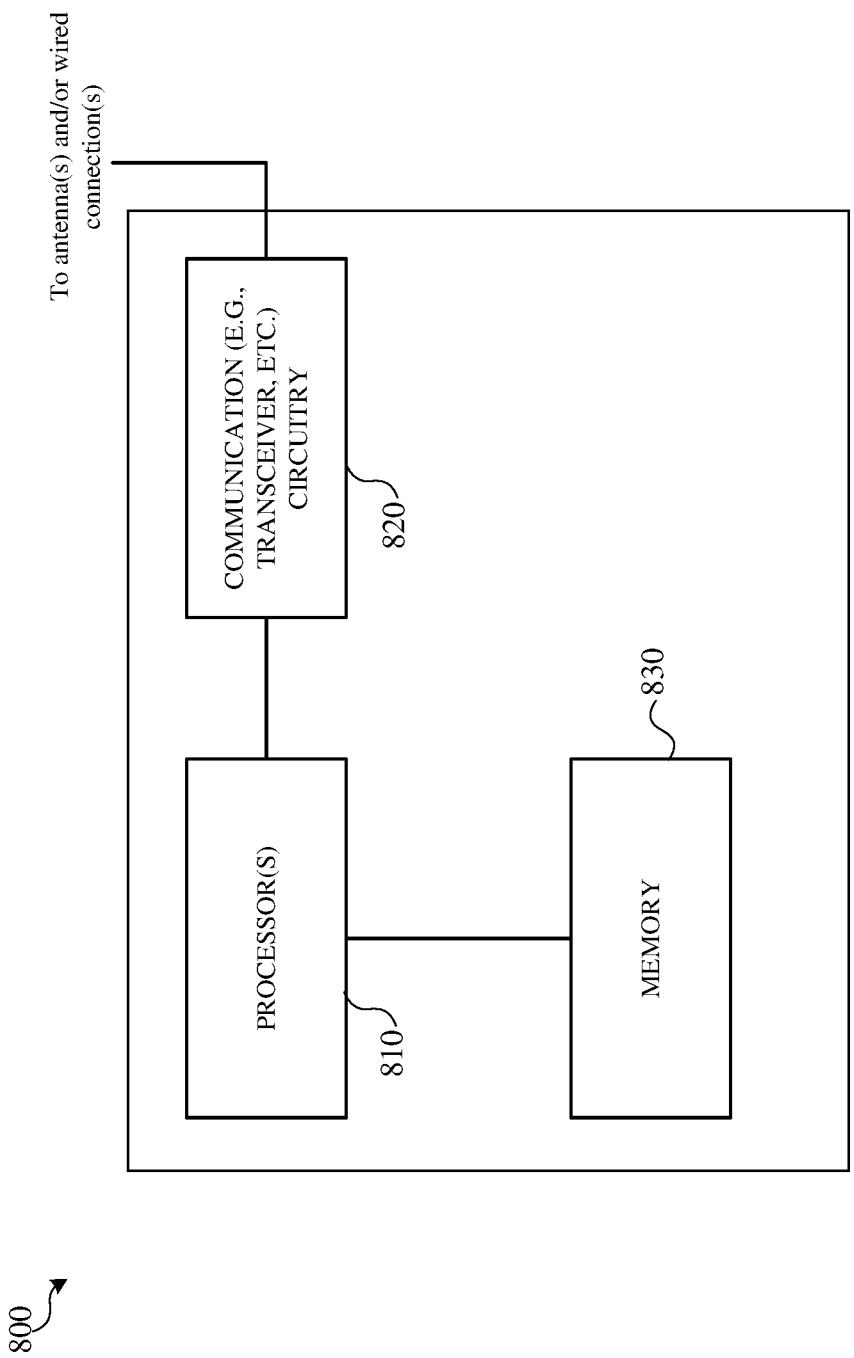
FIG. 8 illustrates a simplified block diagram of a user equipment wireless communication device or other network device/component in accordance with various aspects described.

Referring to FIG. 8, illustrated is a block diagram of a user equipment wireless communication device (UE) or other network device/component (e.g., component of CN 120 or gNB 110) configured to perform sidelink communication, according to various aspects described herein. The UE device 800 includes one or more processors 810 (e.g., one or more baseband processors) comprising processing circuitry and associated interface(s), transceiver circuitry 820 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 830 (which can comprise any of a variety of storage mediums and can store instructions and/or data associated with one or more of processor(s) 810 or transceiver circuitry 820).

In various embodiments (aspects) discussed herein, signals and/or messages can be generated and output for transmission, and/or transmitted messages can be received and processed. Depending on the type of signal or message generated, outputting for transmission (e.g., by processor(s) 810, processor(s) 810, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), polar code etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 810) can comprise one or more of: identifying physical resources associated with the signal/message, detecting the signal/message, resource element group de-interleaving, demodulation, descrambling, and/or decoding.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a networked device or user equipment (UE) for new radio (NR) sidelink communication. The apparatus comprises processing circuitry configured to: process a downlink control information (DCI) to enable the NR sidelink communication based on one or more sidelink configured grants; and determine whether to configure at least one of: an activation operation, a release operation, or a retransmission operation, of the one or more sidelink configured grants based on a DCI format 3_0 configuration of the DCI for the NR sidelink communication and one or more fields of the DCI format 3_0 configuration.

A second example can include the first example, wherein the processing circuitry is further configured to configure the activation operation of the one or more sidelink configured grants based on a hybrid automatic repeat request (HARQ) process ID field of the DCI format 3_0 configuration.

A third example can include the first or second example, wherein the processing circuitry is further configured to configure the release operation of the one or more sidelink configured grants based on a first field and a second field of the DCI format 3_0 configuration, wherein the first field comprises a HARQ process ID field and the second field comprises a frequency (domain) resource assignment field of sidelink control information (SCI) format 0_1.

A fourth example can include any one or more of the first through third examples, wherein the processing circuitry is further configured to release the one or more sidelink configured grants in response to a HARQ process ID field of the DCI format 3_0 configuration indicating which sidelink configured grant index is to be released, and release a plurality of sidelink configured grants in response to a bitmap, a table or a data set comprising one or more sidelink configured grant indices and the HARQ process ID field comprising one or more entries of the bitmap, the table, or the data set.

A fifth example can include any one or more of the first through fourth examples, wherein the processing circuitry is further configured to release the one or more sidelink configured grants in response to a HARQ process ID field of the DCI format 3_0 configuration comprising bits of a same first state and an SCI format 0_1 field for frequency resource assignment of the DCI format 3_0 configuration comprising all bits of a same second state that is different from the same first state.

A sixth example can include any one or more of the first through fifth examples, wherein the processing circuitry is further configured to determine whether to generate the retransmission operation or generate a further determination of whether to perform the activation operation or the release operation, based on a new data indicator (NDI) field of the DCI format 3_0 configuration.

A seventh example can include any one or more of the first through sixth examples, wherein the processing circuitry is further configured to generate the retransmission operation of the one or more sidelink configured grants based on the one or more fields being applicable to a sidelink dynamic grant, wherein the one or more fields comprise at least one of: a HARQ process ID field or a new data indicator (NDI) field, of the DCI format 3_0 configuration.

An eighth example can include any one or more of the first through seventh examples, wherein the processing circuitry is further configured to determine a HARQ process ID based on one or more logical slots to ensure a contiguous time for the NR sidelink communication in response to a configured grant periodicity being based on slots, and based on a first logical slot after a period of the configured grant periodicity for the NR sidelink communication in response to the configured grant periodicity being based on milliseconds.

A ninth example can include any one or more of the first through eighth examples, wherein the processing circuitry is further configured to determine a plurality of HARQ process IDs associated with the one or more sidelink configured grants of the DCI format 3_0 configuration based on a bitmap or a HARQ process ID range.

A tenth example can include any one or more of the first through ninth examples, wherein the processing circuitry is further configured to derive a grant HARQ ID based on a current_slot variable that is derived from a direct frame number (DFN) or a system frame number (SFN), and determine a HARQ process ID from the grant HARQ ID, wherein the grant HARQ ID and the HARQ process ID comprise a one-to-one mapping therebetween.

An eleventh example can include any one or more of the first through tenth examples, wherein the processing circuitry is further configured to align at least one of: a DCI format 3_0 size or a DCI format 3_1 size to a legacy DCI format size according to a fixed size or a configurable size, based on DCI format 0_0, DCI format 0_1, DCI format 0_2, DCI format 1_0, DCI format 1_1, DCI format 1_2, or a maximum number of reserved resources for the NR sidelink communication, wherein, in response to the legacy DCI format size comprising DCI format 0_0 or DCI format 0_1, the processing circuitry is further configured to align the at least one of: the DCI format 3_0 size or the DCI format 3_1 size by zero padding.

A twelfth example can be an apparatus configured to be employed in a user equipment (UE) or a service consumer device for a new radio (NR) network comprising: one or more processors configured to: receive a downlink control information (DCI) for a sidelink configured grant that enables a NR sidelink communication; and determine whether to activate the sidelink configured grant, release at least one sidelink configured grant, or generate a retransmission for the at least one sidelink configured grant, based on one or more fields of a DCI format 3_0 configuration of the DCI.

A thirteenth example can include the twelfth example, wherein the one or more processors are further configured to activate the sidelink configured grant in response to a HARQ process ID field of the DCI format 3_0 configuration comprising all zeros.

A fourteenth example can include any one or more of the twelfth through the thirteenth examples, wherein the one or more processors are further configured to release the sidelink configured grant in response to a HARQ process ID field of the DCI format 3_0 configuration comprising all zeros and an SCI format 0_1 field for frequency resource assignment of the DCI format 3_0 configuration comprising all ones.

A fifteenth example can include any one or more of the twelfth through the fourteenth examples, wherein the one or more processors are further configured to determine a HARQ process ID based on whether a configured grant periodicity is based on slots or milli-seconds.

A sixteenth example can include any one or more of the twelfth through the fifteenth examples, wherein the one or more processors is further configured to derive one or more HARQ process IDs associated with the sidelink configured grant of the DCI format 3_0 configuration based on a bitmap or a HARQ process ID range.

A seventeenth example can be an computer readable storage device storing executable instructions that, in response to execution, cause one or more processors of a user equipment (UE) on a new radio (NR) network to perform operations, the operations comprising: receiving a downlink control information (DCI) for a sidelink configured grant that enables an NR sidelink communication; and determining whether to activate the sidelink configured grant, release at least one sidelink configured grant, or generate a retransmit of the at least one sidelink configured grant, based on one or more fields of a DCI format 3_0 configuration of the DCI.

An eighteenth example can include the seventeenth example, wherein the operations further comprise: determining whether to generate a retransmission operation or generate a further determination of whether to generate an activation operation or a release operation, based on a new data indicator (NDI) field of the DCI format 3_0 configuration; generating the activation operation of the sidelink configured grant based on a hybrid automatic repeat request (HARQ) process ID field of the DCI format 3_0 configuration; and generating the release operation of the sidelink configured grant based on a sidelink control information (SCI) format 0_1 field for frequency resource assignment of the DCI format 3_0 configuration and the HARQ process ID field.

A nineteenth example includes any one or more of the seventeenth through eighteenth examples, wherein the operations further comprise: releasing the at least one sidelink configured grant and activating the at least one sidelink configured grant based on a HARQ process ID field of the DCI format 3_0 configuration and a frequency (domain) resource assignment field of sidelink control information (SCI) format 0_1, wherein the HARQ process ID field is equal to a sidelink configured grant index, or indicates an entry of a data set, a bitmap or a table that comprises one or more sidelink configured grant indices.

A twentieth example includes any one or more of the seventeenth through nineteenth examples, wherein the operations further comprise: determining whether to initiate a retransmission operation for a retransmission of the sidelink configured grant based on a field of the DCI format 3_0 configuration that is applicable to a sidelink dynamic grant, wherein the sidelink configured grant is based on a different RNTI than the sidelink dynamic grant.

As further examples: 1. Below discusses the details on some of the identified remaining tasks, including DCI contents, DCI format size alignment, sidelink HARQ feedback report to gNB, multiplexing multiple sidelink HARQ, as well as HARQ process ID determination for configured grant.

2. DCI contents: The DCI format 3_0 is defined for gNB scheduling NR sidelink transmissions. The fields of DCI format 3_0 include: Time gap; HARQ process ID; NDI; lowest sub-channel index of the initial transmission; SCI format 0_1 fields of frequency and time resource assignment; PSFCH-to-HARQ feedback timing indicator; configuration index. The bit size of time gap, HARQ process ID, and configuration index fields has not been specified. The time gap field provides an index into a slot offset table given by higher layer parameter. This slot offset table can have up to 8 entries, and hence, 3 bits are used for this field. Like in NR Uu, up to 16 HARQ processes for sidelink can be supported, and 4 bits used for the HARQ process ID field. In LTE V2X, a maximum of 8 sidelink SPS configurations are supported. In NR V2X, a maximum of 8 configured grants are supported. Hence, an embodiment is to use 3 bits for the configuration index field.

Proposal 1: In DCI format 3_0, the field of HARQ process ID has 4 bits; the field of time gap has 3 bits; the field of configuration index has 3 bits. The DCI format 3_0 is used to activate or release type 2 sidelink configured grant. Similar to NR type 2 uplink configured grant, the activation or release of type 2 sidelink configured grant can be validated by special fields of DCI format 3_0. For example, the HARQ process ID field in DCI format 3_0 could be all 0's for activating or releasing type 2 sidelink configured grant. Furthermore, it is assumed that a valid SCI format 0_1 field of frequency resource assignment cannot be all 1's. Hence, the distinguish between activation and release of a type 2 sidelink configured grant is achieved by checking whether the SCI format 0_1 field of frequency resource assignment is all 1's or not. If this field is all 1's, then the DCI format 3_0 is considered to release a type 2 sidelink configured grant. Otherwise, the DCI format 3_0 is considered to activate a type 2 sidelink configured grant.

Proposal 2: To validate activating a type 2 sidelink configured grant in DCI format 3_0, the HARQ process ID is all 0's and SCI format 0_1 field of frequency resource assignment is not all 1's. To validate releasing a type 2 sidelink configured grant in DCI format 3_0, the HARQ process ID is all 0's and SCI format 0_1 field of frequency resource assignment is all 1's.

2.2. DCI format size alignment: The size of DCI format 3_0 and the size of one of the existing NR DCI formats are aligned. It can be open to which existing NR DCI format the DCI format 3_0 is aligned. It is beneficial to align DCI format 3_0 to an existing DCI format with similar payload size. With the known DCI format 3_0 contents, the DCI format 3_0 has a similar payload size as DCI format 0_0. The payload size alignment between DCI format 3_0 and DCI format 0_0 is achievable by zero padding.

Proposal 3: The NR DCI format 3_0 could be payload size aligned to NR DCI format 0_0 via zero-padding.

2.5 HARQ process ID determination for configured grant: In NR Uu, an uplink configured grant may have multiple HARQ processes and the number of HARQ processes is a part of configuration of uplink configured grant. This similar scheme should be extended to sidelink configured grant, i.e., multiple HARQ processes are allocated to a sidelink configured grant. This increases the throughput of sidelink transmissions. A sidelink dynamic grant is used to provide resources for retransmission for a configured grant. Since a HARQ process ID is contained in this dynamic grant, gNB needs to calculate the HARQ process ID for the dynamic grant for retransmission. Like in Uu, the HARQ process ID for sidelink is obtained based on the sidelink slot index for the initial sidelink transmission, configured grant periodicity and the number of HARQ processes in a sidelink configured grant. Since multiple configured grant configurations are supported for sidelink, the exact HARQ process IDs should be allocated to each configured grant to avoid HARQ process ID ambiguity. Hence, the sidelink configured grant configuration includes the associated HARQ process IDs.

Proposal 11: HARQ process ID of a configured grant is determined by the physical resource of the first sidelink transmission. A sidelink configured grant configuration includes its associated HARQ process IDs.

Conclusion Proposals: Proposal 1: In DCI format 3_0, the field of HARQ process ID has 4 bits; the field of time gap has 3 bits; the field of configuration index has 3 bits. Proposal 2: To validate activating a type 2 sidelink configured grant in DCI format 3_0, the HARQ process ID is all 0's and SCI format 0_1 field of frequency resource assignment is not all 1's. To validate releasing a type 2 sidelink configured grant in DCI format 3_0, the HARQ process ID is all 0's and SCI format 0_1 field of frequency resource assignment is all 1's. Proposal 3: The NR DCI format 3_0 should be payload size aligned to NR DCI format 0_0 via zero-padding. Proposal 11: HARQ process ID of a configured grant is determined by the physical resource of the first sidelink transmission. A sidelink configured grant configuration includes its associated HARQ process IDs.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE) comprising:
radio frequency (RF) circuitry;
a memory; and
processing circuitry coupled to the memory and configured to execute instructions stored in the memory to cause the UE to:
receive a physical downlink control channel (PDCCH) to activate a sidelink configured grant for a sidelink communication;
derive a hybrid automatic repeat request (HARQ) process identifier (ID) for the sidelink configured grant based on a current slot variable that is a function of a system frame number (SFN);

transmit, via the RF circuitry, the sidelink communication based on the HARQ process ID;
receive downlink control information (DCI) with DCI format 3_0 including a frequency resource assignment (FRA) field; and
in response to the FRA field of the DCI being set to all ones, processing a release operation for the sidelink configured grant.

2. The UE of claim 1, wherein the processing circuitry is further configured to cause the UE to:
generate a retransmission operation of the sidelink configured grant based on at least one of: the HARQ process ID or a new data indicator (NDI) field corresponding to a sidelink dynamic grant.

3. The UE of claim 1, wherein the processing circuitry is further configured to cause the UE to:
determine whether to initiate a retransmission operation for a retransmission of the sidelink configured grant based on a field of a subsequent DCI with DCI format 3_0.

4. The UE of claim 3, wherein the field of the subsequent DCI with DCI format 3_0 is applicable to a sidelink dynamic grant, and wherein the sidelink configured grant is based on a different radio network temporary identifier (RNTI) than the sidelink dynamic grant.

5. The UE of claim 1, wherein the processing circuitry is further configured to cause the UE to:
determine the HARQ process ID based on a representation as follows:

[floor(CURRENT_slot/sl-PeriodCG)] modulo sl-NrOfHARQ-Processes, where the CURRENT_slot as the current slot variable is equal to (SFN×numberOfSlotsPerFrame+slot number in frame).

6. The UE of claim 5, wherein the HARQ process ID is mapped to a grant HARQ ID in a one-to-one mapping.

7. The UE of claim 6, wherein the HARQ process ID is a sum of the grant HARQ ID and a minimum HARQ process ID for a range of HARQ process IDs.

8. The UE of claim 1, wherein the HARQ process ID comprises a HARQ process number, and the processing circuitry is further configured to cause the UE to:
determine whether a field of a subsequent DCI with DCI format 3_0 is masked with a sidelink radio network temporary identifier (SL-RNTI); and
process an activation or release operation for the sidelink configured grant based on the determination of whether the field is masked with the SL-RNTI.

9. The UE of claim 1, wherein the HARQ process ID comprises a HARQ process number, and the processing circuitry is further configured to cause the UE to:
determine whether the HARQ process number comprises all zeros; and
in response to the HARQ process number not comprising all zeros, release or ignore the sidelink configured grant.

10. The UE of claim 1, wherein the HARQ process ID comprises a HARQ process number.

11. A computer readable storage device storing executable instructions that, in response to execution, cause one or more processors to perform operations comprising:
receiving a physical downlink control channel (PDCCH) to activate a sidelink configured grant for a sidelink communication;
determining a hybrid automatic repeat request (HARQ) process identifier (ID) for the sidelink configured grant based on a current slot variable;

providing the sidelink communication based on the HARQ process ID;
receiving downlink control information (DCI) with DCI format 3_0; and
determining a release of the sidelink configured grant based on a HARQ process ID field and a frequency resource assignment (FRA) field of the DCI.

12. The computer readable storage device of claim 11, wherein the operations further comprise:
determining an activation of the sidelink configured grant based on a HARQ process ID field of a subsequent downlink control information (DCI) with DCI format 3_0.

13. The computer readable storage device of claim 11, wherein the operations further comprise:
generating a retransmission operation of the sidelink configured grant based on at least one of: the HARQ process ID, a new data indicator (NDI) field corresponding to a sidelink dynamic grant, or a frequency resource assignment (FRA) field.

14. The computer readable storage device of claim 11, wherein the HARQ process ID comprises a HARQ process number, and wherein the operations further comprise:
determining whether the HARQ process number comprises all zeros; and
in response to the HARQ process number not comprising all zeros, releasing or ignoring the sidelink configured grant.

15. The computer readable storage device of claim 11, wherein the HARQ process ID comprises a HARQ process number, and wherein the operations further comprise:
determining whether a frequency resource assignment (FRA) of the sidelink configured grant is set to all ones; and
in response to the FRA being set to all ones, releasing the sidelink configured grant.

16. A baseband processor configured to, when executing instructions stored in a memory, perform operations comprising:
receiving a physical downlink control channel (PDCCH) to activate a sidelink configured grant for a sidelink communication;
determining a hybrid automatic repeat request (HARQ) process identifier (ID) for the sidelink configured grant based on a current slot variable;
providing, to a radio frequency (RF) interface for transmission, the sidelink communication based on the HARQ process ID; and
receiving downlink control information (DCI) indicating a HARQ process number; and
in response to the HARQ process number not comprising all zero s, releasing the sidelink configured grant.

17. The baseband processor of claim 16, wherein the operations further comprise:
determining an activation of the sidelink configured grant based on a HARQ process ID field of a subsequent downlink control information (DCI) with DCI format 3_0, wherein the current slot variable is a function of a system frame number (SFN).

18. The baseband processor of claim 16, wherein the DCI includes a HARQ process ID field indicating the HARQ process number.

19. The baseband processor of claim 16, wherein the HARQ process ID is a HARQ process number, and wherein the operations further comprise:

determining whether a frequency resource assignment (FRA) of the sidelink configured grant is set to all ones; and in response to the FRA being set to all ones, releasing the sidelink configured grant.

\* \* \* \* \*